United States Patent
Ando

(10) Patent No.: US 12,012,011 B2
(45) Date of Patent: Jun. 18, 2024

(54) VEHICLE AND LOCKING CONTROL SYSTEM

(71) Applicant: Toyota Jidosha Kabushiki Kaisha, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 812 days.

(21) Appl. No.: 17/109,737

(22) Filed: Dec. 2, 2020

(65) Prior Publication Data

US 2021/0170898 A1    Jun. 10, 2021

(30) Foreign Application Priority Data

Dec. 4, 2019    (JP) ................. 2019-219613

(51) Int. Cl.
| | |
|---|---|
| *B60L 53/60* | (2019.01) |
| *B60L 53/16* | (2019.01) |
| *B60L 53/18* | (2019.01) |
| *E05B 77/00* | (2014.01) |
| *E05B 81/56* | (2014.01) |

(52) U.S. Cl.
CPC ............. *B60L 53/60* (2019.02); *B60L 53/16* (2019.02); *B60L 53/18* (2019.02); *E05B 77/00* (2013.01); *E05B 81/56* (2013.01); *E05Y 2400/45* (2013.01); *E05Y 2900/50* (2013.01)

(58) Field of Classification Search
CPC .......... B60L 53/60; B60L 53/16; B60L 53/18; B60L 2240/80; B60L 53/22; B60L 53/68; E05B 77/00; E05B 81/56; E05Y 2400/45; E05Y 2900/50; Y02T 10/70; Y02T 10/7072; Y02T 90/12; Y02T 90/14; Y02T 90/16
See application file for complete search history.

(56) References Cited

U.S. PATENT DOCUMENTS

2017/0217403 A1    8/2017  Kim
2017/0297443 A1*  10/2017  You ..................... H01R 13/6395

FOREIGN PATENT DOCUMENTS

| DE | 102016208316 A1 | 8/2017 |
|---|---|---|
| JP | 2010-264847 A | 11/2010 |
| JP | 2015-023747 A | 2/2015 |

(Continued)

OTHER PUBLICATIONS

English Translation: Hatsumi et al., JP 2018029417 A1, Feb. 22, 2018, Japanese Patent Office Publication (Year: 2018).*
Machine translation of WO2013137029A1 (Year: 2013).*

*Primary Examiner* — Navid Z. Mehdizadeh
*Assistant Examiner* — Caitlin R McCleary
(74) *Attorney, Agent, or Firm* — Dinsmore & Shohl LLP

(57) ABSTRACT

An ECU of a vehicle has a first mode and a second mode as an operation mode of a locking device. The first mode is a mode of bringing the locking device into a locked state when a charging connector is connected to an inlet. The second mode is a mode of maintaining the locking device in an unlocked state when the charging connector is connected to the inlet. The ECU of the vehicle determines whether or not the charging connector is connected to the inlet. The ECU does not permit a setting change of the operation mode of the locking device when the charging connector is connected to the inlet.

8 Claims, 6 Drawing Sheets

(56) References Cited

FOREIGN PATENT DOCUMENTS

| | | | | |
|---|---|---|---|---|
| JP | 2016-048983 A | | 4/2016 | |
| JP | 2018029417 A | * | 2/2018 | |
| WO | WO-2013137029 A1 | * | 9/2013 | .............. B60L 53/16 |

* cited by examiner

VEHICLE AND LOCKING CONTROL SYSTEM

CROSS REFERENCE TO RELATED APPLICATIONS

This nonprovisional application claims priority to Japanese Patent Application No. 2019-219613 filed on Dec. 4, 2019 with the Japan Patent Office, the entire contents of which are hereby incorporated by reference.

BACKGROUND

Field

The present disclosure relates to a vehicle that performs charging of a power storage device mounted on the vehicle, using electric power supplied from a power supply external to the vehicle.

Description of the Background Art

Japanese Patent Laying-Open No. 2015-23747 discloses a vehicle that performs alternating current (AC) charging to charge a power storage device mounted on the vehicle, using electric power supplied from an AC power supply external to the vehicle through a charging cable. The vehicle includes an inlet connectable to a connector provided at a tip of the charging cable, and a locking device that switches between a locked state in which the connector connected to the inlet cannot be removed from the inlet and an unlocked state in which the connector connected to the inlet can be removed from the inlet. In the vehicle, when the connector is connected to the inlet, the locking device is brought into the locked state, so that removal of the connector from the inlet becomes impossible. That is, at the time of the AC charging, the locking device is brought into the locked state.

SUMMARY

There may be needs for selecting the state (locked state, unlocked state) of the locking device during charging in accordance with situations or preferences. Therefore, it is conceivable to provide, as an operation mode of the locking device, a first mode of bringing the locking device into the locked state when the connector is connected to the inlet and a second mode of maintaining the locking device in the unlocked state when the connector is connected to the inlet, and make a setting change between these two operation modes.

In the above-described configuration, there may arise a case in which the operation mode is switched in a state where the connector is connected to the inlet (in the locked state or in the unlocked state). Depending on specifications of the vehicle, even when the setting change of the operation mode is made, the state of the locking device does not shift in accordance with the setting change of the operation mode.

In the case of the vehicle configured in accordance with the above-described specification, when the operation mode is switched in the state where the connector is connected to the inlet, a mismatch (inconsistency) occurs between the operation mode and the state of the locking device. For example, when the connector is connected to the inlet in the first mode, the locking device is brought into the locked state. When the operation mode is switched from the first mode to the second mode in this case, a mismatch occurs in which the locking device is in the locked state although the operation mode is the second mode (unlocked state). For example, when the connector is connected to the inlet in the second mode, the locking device is maintained in the unlocked state. When the operation mode is switched from the second mode to the first mode in this case, a mismatch occurs in which the locking device is in the unlocked state although the operation mode is the first mode.

The present disclosure has been made to solve the above-described problem, and an object of the present disclosure is to suppress the occurrence of a mismatch between an operation mode and a state of a locking device in a vehicle including the locking device having a plurality of operation modes.

(1) A vehicle according to an aspect of the present disclosure is a vehicle that performs charging of a power storage device mounted on the vehicle, using electric power supplied through a charging cable from a power supply external to the vehicle. The vehicle includes: an inlet to which a connector provided in the charging cable is connectable; a locking device that switches between a locked state and an unlocked state of the connector connected to the inlet and the inlet; and a controller that controls the locking device. The controller sets an operation mode for operating the locking device to a first mode or a second mode, the first mode being a mode of bringing the locking device into the locked state when the connector is connected to the inlet, the second mode being a mode of maintaining the locking device in the unlocked state when the connector is connected to the inlet. The controller does not permit a setting change of the operation mode when the connector is connected to the inlet.

According to the above-described configuration, the setting change of the operation mode is not permitted when the connector is connected to the inlet. That is, in a situation in which the connector is connected to the inlet, the setting change of the operation mode is never made. Therefore, the occurrence of a mismatch between the operation mode and the state of the locking device can be suppressed.

(2) In an embodiment, the controller permits the setting change of the operation mode when the connector is not connected to the inlet.

According to the above-described configuration, the setting change of the operation mode is permitted when the connector is not connected to the inlet. Therefore, the operation mode of the locking device can be selected in accordance with, for example, situations of the vehicle and user's preferences.

(3) In an embodiment, the controller receives a signal for the setting change of the operation mode based on a user operation. The controller changes a setting of the operation mode based on the signal, when the controller permits the setting change of the operation mode.

According to the above-described configuration in (3), the user can change the setting of the operation mode when the setting change of the operation mode is permitted, i.e., when the connector is not connected to the inlet.

(4) In an embodiment, the vehicle further includes a setting device operated by a user for making the signal. The setting device outputs the signal based on the user operation.

According to the above-described configuration in (4), when the setting change of the operation mode is permitted, i.e., when the connector is not connected to the inlet, the user can change the setting of the operation mode by operating the setting device.

(5) A locking control system according to another aspect of the present disclosure includes a locking device and a controller that controls the locking device. The locking device switches between a locked state of a connector and an inlet of a vehicle and an unlocked state of the connector and the inlet, the vehicle performing charging of a power storage device mounted on the vehicle, using electric power supplied through a charging cable from a power supply external to the vehicle, the connector being provided in the charging cable and connected to the inlet. The controller sets an operation mode of the locking device to a first mode or a second mode, the first mode being a mode of bringing the locking device into the locked state when the connector is connected to the inlet, the second mode being a mode of maintaining the locking device in the unlocked state when the connector is connected to the inlet. The controller does not permit a setting change of the operation mode when the connector is connected to the inlet.

The foregoing and other objects, features, aspects and advantages of the present disclosure will become more apparent from the following detailed description of the present disclosure when taken in conjunction with the accompanying drawings.

DETAILED DESCRIPTION

Figure 1:
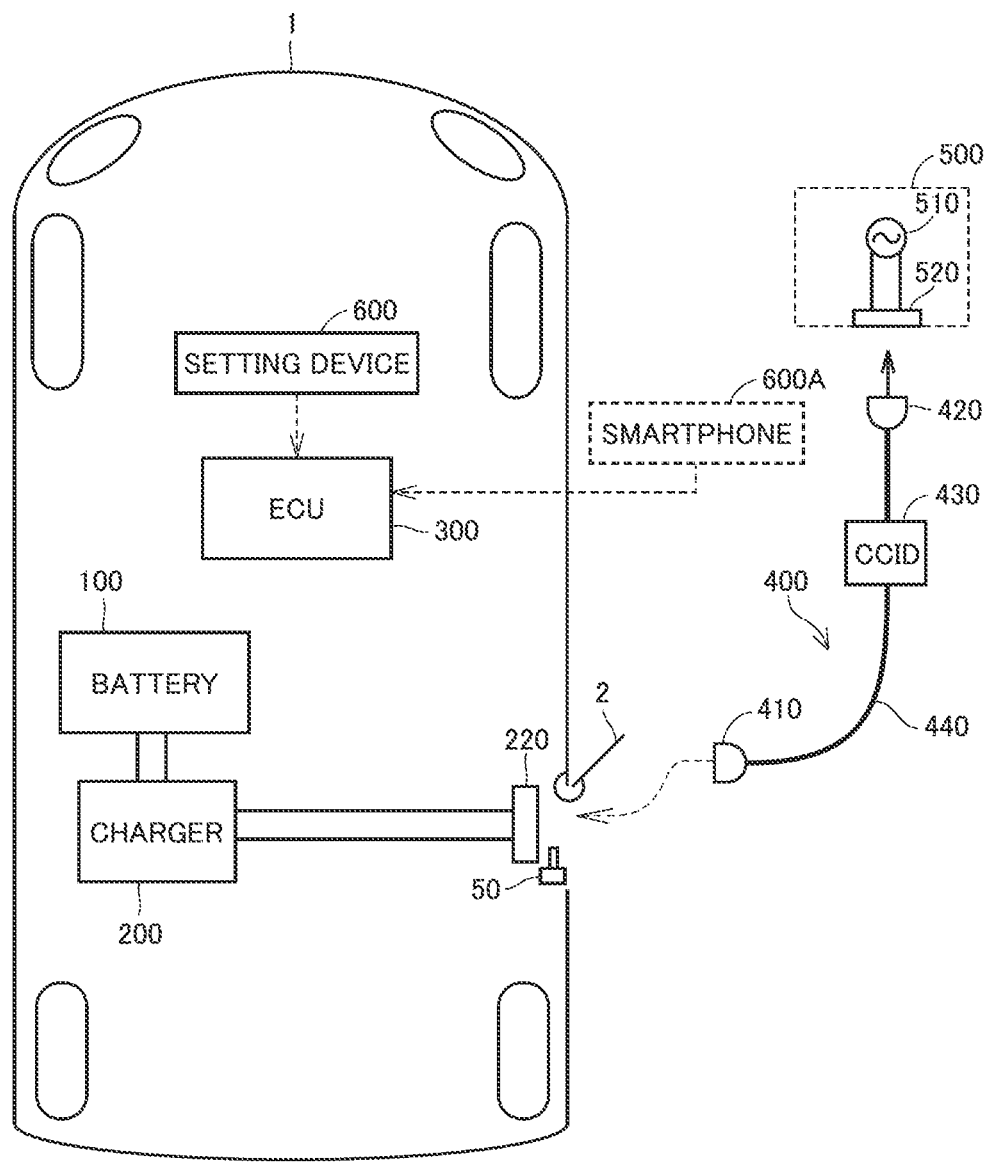
FIG. 1 is an overall configuration diagram of a charging system of a vehicle according to an embodiment.

An embodiment of the present disclosure will be described in detail hereinafter with reference to the drawings, in which the same or corresponding portions are denoted by the same reference characters and description thereof will not be repeated.

<Overall Configuration>

FIG. 1 is an overall configuration diagram of a charging system of a vehicle 1 according to the present embodiment. The charging system is a system for performing external charging to charge a battery 100 mounted on vehicle 1, using electric power supplied from a charging facility external to vehicle 1. In the present embodiment, description will be given of a case in which AC charging for charging battery 100 mounted on vehicle 1 using AC power supplied from a charging facility 500 provided, for example, at home is performed as the external charging. In the present embodiment, the case of using the AC power supplied from charging facility 500 provided at home or the like will be described as an example of the AC charging. However, AC power supplied from, for example, a public charging facility (charging stand) may be used.

Referring to FIG. 1, the charging system includes vehicle 1, a charging cable 400 and charging facility 500.

Charging facility 500 includes an AC power supply 510 and an electrical outlet 520. Electrical outlet 520 is, for example, an AC electrical outlet for general household use.

During the AC charging, charging facility 500 and vehicle 1 are connected by charging cable 400. Charging cable 400 includes an AC power line 440, a charging connector 410 provided at one end of AC power line 440, a plug 420 provided at the other end of AC power line 440, and a charging circuit interrupt device (hereinafter, also referred to as "CCID") 430 provided on AC power line 440. Charging connector 410 is connectable to an inlet 220 of vehicle 1. Plug 420 is connectable to electrical outlet 520 of charging facility 500. CCID 430 is a circuit for switching between supply and cutoff of electric power from charging facility 500 to vehicle 1.

Vehicle 1 is an electric vehicle that travels by driving a not-shown traveling motor using electric power stored in battery 100. Vehicle 1 may be any vehicle as long as it performs the external charging of battery 100, and vehicle 1 may be, for example, a fuel cell vehicle or a plug-in hybrid vehicle.

Vehicle 1 includes battery 100 and an electronic control unit (ECU) 300. In addition, vehicle 1 includes a charging lid 2, a charger 200 and inlet 220 as a configuration for performing the AC charging.

Battery 100 is mounted on vehicle 1 as a driving power source (i.e., motive power source) for vehicle 1. Battery 100 includes a plurality of stacked cells. Each cell is, for example, a secondary cell such as a nickel metal-hydride cell or a lithium ion cell. Each cell may be a cell having a liquid electrolyte between a positive electrode and a negative electrode, or may be a cell having a solid electrolyte (all-solid-state cell). Battery 100 may be any battery as long as it is a rechargeable DC power supply, and a large-capacitance capacitor can also be used.

ECU 300 includes a central processing unit (CPU) 310 (see FIG. 2), a memory (not shown), and an input and output buffer (not shown). ECU 300 receives the signals from the sensors and the like and outputs the control signals to the respective devices, and controls the respective devices. The control may be implemented by not only software but also dedicated hardware (electric circuit).

Charging connector 410 of charging cable 400 is connectable to inlet 220. Inlet 220 is covered with charging lid 2 during the normal time. When charging lid 2 is opened, the user can connect charging connector 410 to inlet 220. During the AC charging, charging connector 410 is connected to inlet 220.

Charger 200 converts AC power received at inlet 220 into DC power that can be charged into battery 100, and outputs the DC power to battery 100. Charger 200 is controlled by ECU 300.

A locking device 50 is provided near inlet 220. Locking device 50 switches between a locked state in which insertion and removal of charging connector 410 (charging cable 400) connected to inlet 220 into and from inlet 220 are restricted and an unlocked state in which charging connector 410 connected to inlet 220 can be inserted into and removed from inlet 220. A configuration of locking device 50 will be described with reference to FIGS. 4 to 6 below.

Figure 2:
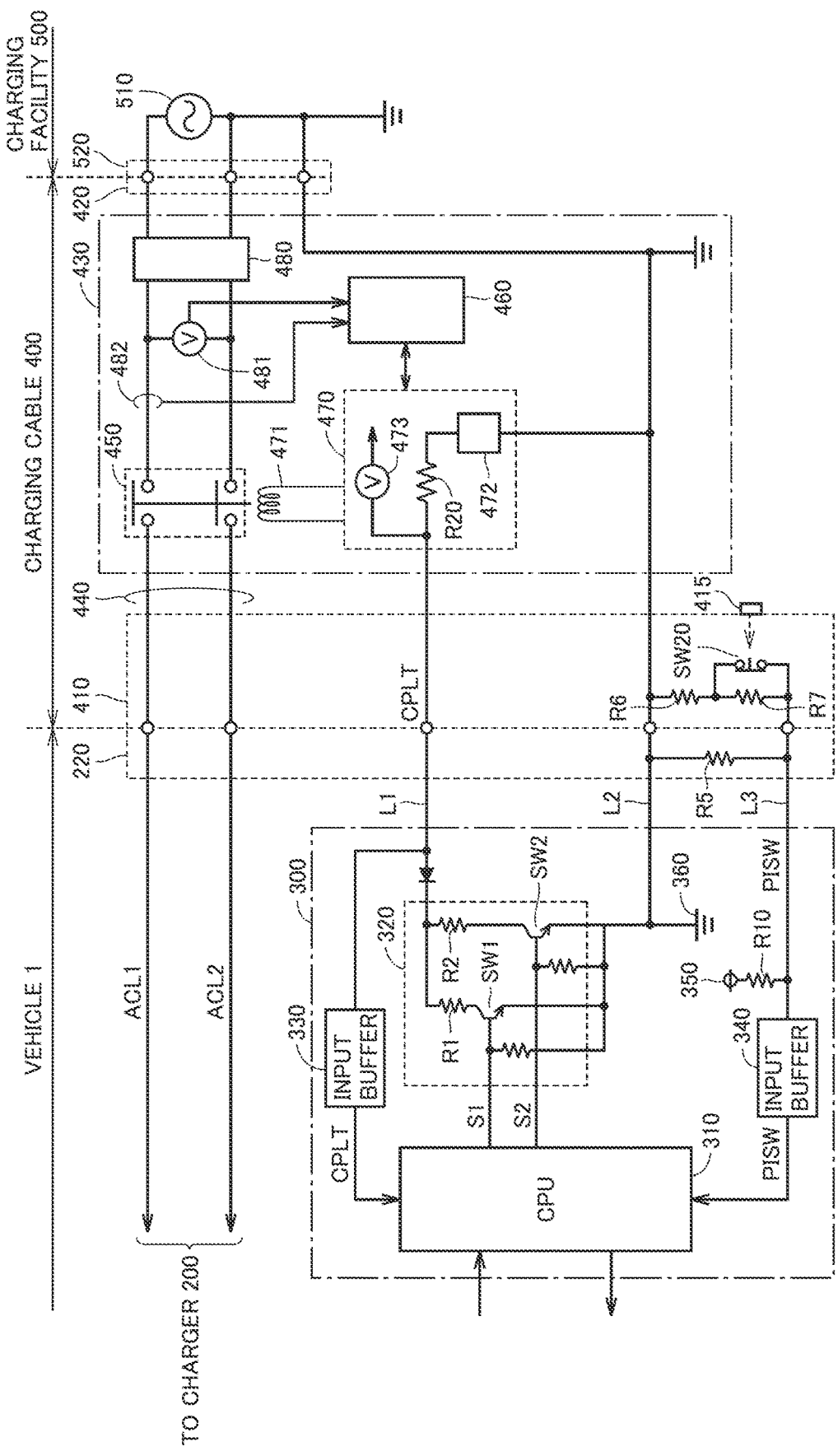
FIG. 2 shows an example circuit configuration of the charging system.

FIG. 2 shows an example circuit configuration of the charging system. In FIG. 2, charging connector 410 of charging cable 400 is connected to inlet 220. ECU 300 of vehicle 1 receives a connection signal PISW having a potential that changes in accordance with a connection state between inlet 220 and charging connector 410. Based on the potential of connection signal PISW, ECU 300 determines whether or not charging connector 410 is connected to inlet 220.

When charging cable 400 is connected to charging facility 500 and inlet 220, ECU 300 receives a pilot signal CPLT from CCID 430 of charging cable 400 through a signal line L1. Pilot signal CPLT is a signal for providing a notification about a rated current of charging cable 400 from a CPLT control circuit 470 to ECU 300. In addition, pilot signal CPLT has a potential controlled by ECU 300 of vehicle 1 and is used as a signal for remotely controlling a CCID relay 450 from ECU 300.

CCID 430 in charging cable 400 includes CCID relay 450, a CCID control unit 460, CPLT control circuit 470, an electromagnetic coil 471, an electric leakage detector 480, a voltage sensor 481, and a current sensor 482.

CCID relay 450 is provided in a power feeding path to vehicle 1 and is controlled by CPLT control circuit 470. When CCID relay 450 is in an open state, the power feeding path is cut off, and thus, electric power cannot be supplied from charging facility 500 to vehicle 1. When CCID relay 450 is in a closed state, electric power can be supplied from charging facility 500 through charging cable 400 to vehicle 1.

CCID control unit 460 includes a CPU, a memory, an input and output port, and the like (all are not shown). CCID control unit 460 inputs and outputs the signals to and from various sensors and CPLT control circuit 470, and controls the operation of CPLT control circuit 470.

CPLT control circuit 470 outputs pilot signal CPLT to ECU 300 through charging connector 410 and inlet 220. Pilot signal CPLT has a potential controlled by ECU 300 of vehicle 1 and is used as a signal for remotely controlling CCID relay 450 from ECU 300. CPLT control circuit 470 controls CCID relay 450 based on the potential of pilot signal CPLT. Pilot signal CPLT is also used as a signal for providing a notification about the rated current of charging cable 400 from CPLT control circuit 470 to ECU 300.

Specifically, CPLT control circuit 470 includes an oscillator 472, a resistor R20 and a voltage sensor 473.

When the potential of pilot signal CPLT detected by voltage sensor 473 is a defined potential V1 (e.g., 12 V), oscillator 472 outputs non-oscillating pilot signal CPLT. When the potential of pilot signal CPLT drops to a potential V2 (e.g., 9 V) lower than above-described defined potential V1, oscillator 472 is controlled by CCID control unit 460 and outputs pilot signal CPLT that oscillates at a defined frequency (e.g., 1 kHz) and duty cycle.

The duty cycle of pilot signal CPLT is set in accordance with the rated current of charging cable 400. ECU 300 of vehicle 1 can detect the rated current of charging cable 400 based on the duty cycle of pilot signal CPLT received from CPLT control circuit 470 through signal line L1.

When the potential of pilot signal CPLT drops to V3 (e.g., 6 V) that is further lower than V2, CPLT control circuit 470 supplies a current to electromagnetic coil 471. When the current is supplied from CPLT control circuit 470 to electromagnetic coil 471, electromagnetic coil 471 generates electromagnetic force and CCID relay 450 enters the closed state. As a result, a power feeding voltage (voltage from charging facility 500) is applied to inlet 220 of vehicle 1 through charging cable 400.

Electric leakage detector 480 is provided at some midpoint in AC power line 440 of charging cable 400 within CCID 430, to detect the presence or absence of electric leakage. Specifically, electric leakage detector 480 detects an equilibrium state of currents flowing, in opposite directions, through a pair of power lines that form AC power line 440, and detects the occurrence of electric leakage when the equilibrium state is broken. When the electric leakage is detected by electric leakage detector 480, power feeding to electromagnetic coil 471 is stopped and CCID relay 450 enters the open state.

When plug 420 of charging cable 400 is inserted into electrical outlet 520, voltage sensor 481 detects a power supply voltage transmitted from charging facility 500, and provides a notification about the detected value to CCID control unit 460. Current sensor 482 detects a charging current flowing through AC power line 440, and provides a notification about the detected value to CCID control unit 460.

Resistors R6 and R7 and a switch SW20 are provided in charging connector 410. Resistors R6 and R7 and switch SW20 form a circuit that detects the connection state between charging connector 410 and inlet 220, together with a power supply node 350 and a pull-up resistor R10 provided in ECU 300 of vehicle 1 and a resistor R5 provided in inlet 220.

Resistors R6 and R7 are connected in series between a ground line L2 and a connection signal line L3. Switch SW20 is connected in parallel with resistor R7. Switch SW20 is implemented by, for example, a limit switch, and a contact point thereof is closed when charging connector 410 is connected to inlet 220. In addition, switch SW20 and push button 415 provided on charging connector 410 work together. Push button 415 is operated by the user when the user removes charging connector 410 from inlet 220. When push button 415 is not pressed, switch SW20 is in a closed state. When push button 415 is pressed, switch SW20 enters an open state.

With the above-described circuit configuration, in a state where charging connector 410 is not connected to inlet 220, a signal having a potential Vx determined by a voltage of power supply node 350, pull-up resistor R10 and resistor R5 is generated in connection signal line L3 as connection signal PISW.

In a state where charging connector 410 is connected to inlet 220 (push button 415 is not operated), a signal having a potential Vy determined by the voltage of power supply node 350, pull-up resistor R10 and resistors R5 and R6 is generated in connection signal line L3 as connection signal PISW. When push button 415 is operated in a state where charging connector 410 is inserted into inlet 220, a signal having a potential Vz determined by the voltage of power supply node 350, pull-up resistor R10 and resistors R5 to R7 is generated in connection signal line L3 as connection signal PISW. Therefore, ECU 300 can detect the connection state between charging connector 410 and inlet 220 by detecting the potential of connection signal PISW.

In vehicle 1, ECU 300 further includes CPU 310, a resistance circuit 320, and input buffers 330 and 340, in addition to above-described power supply node 350 and pull-up resistor R10.

Resistance circuit 320 is a circuit for controlling the potential of pilot signal CPLT communicated through signal line L1. Resistance circuit 320 includes pull-down resistors R1 and R2 and switches SW1 and SW2. Pull-down resistor R1 and switch SW1 are connected in series between signal line L1 through which pilot signal CPLT is communicated and a vehicle earth 360. Pull-down resistor R2 and switch SW2 are also connected in series between signal line L1 and vehicle earth 360. Switches SW1 and SW2 are controlled to an electrically conductive (on) state or an electrically nonconductive (off) state in accordance with control signals S1 and S2 from CPU 310, respectively.

Input buffer 330 is a circuit for introducing pilot signal CPLT into CPU 310 from signal line L1. Input buffer 340 is a circuit for introducing connection signal PISW into CPU 310 from connection signal line L3.

CPU 310 receives pilot signal CPLT from input buffer 330. In addition, CPU 310 receives connection signal PISW from input buffer 340. CPU 310 detects the potential of connection signal PISW, and detects the connection state between inlet 220 and charging connector 410 based on the potential of connection signal PISW. In addition, CPU 310 detects the rated current of charging cable 400 by detecting the oscillation state and the duty cycle of pilot signal CPLT.

Furthermore, when charging connector 410 is connected to inlet 220, CPU 310 controls the potential of pilot signal CPLT by controlling switches SW1 and SW2 in resistance circuit 320, and requests supply and stop of electric power for charging facility 500. Specifically, CPU 310 controls the potential of pilot signal CPLT, to thereby remotely control CCID relay 450 in charging cable 400.

When the contact point of CCID relay 450 in charging cable 400 is closed as a result of remote control by CPU 310, AC power from charging facility 500 is provided to charger 200 and preparation for AC charging is completed. CPU 310 controls charger 200 to convert the AC power from charging facility 500 into DC power that can be charged into battery 100 and output the DC power to battery 100. Thus, AC charging of battery 100 is performed.

Figure 3:
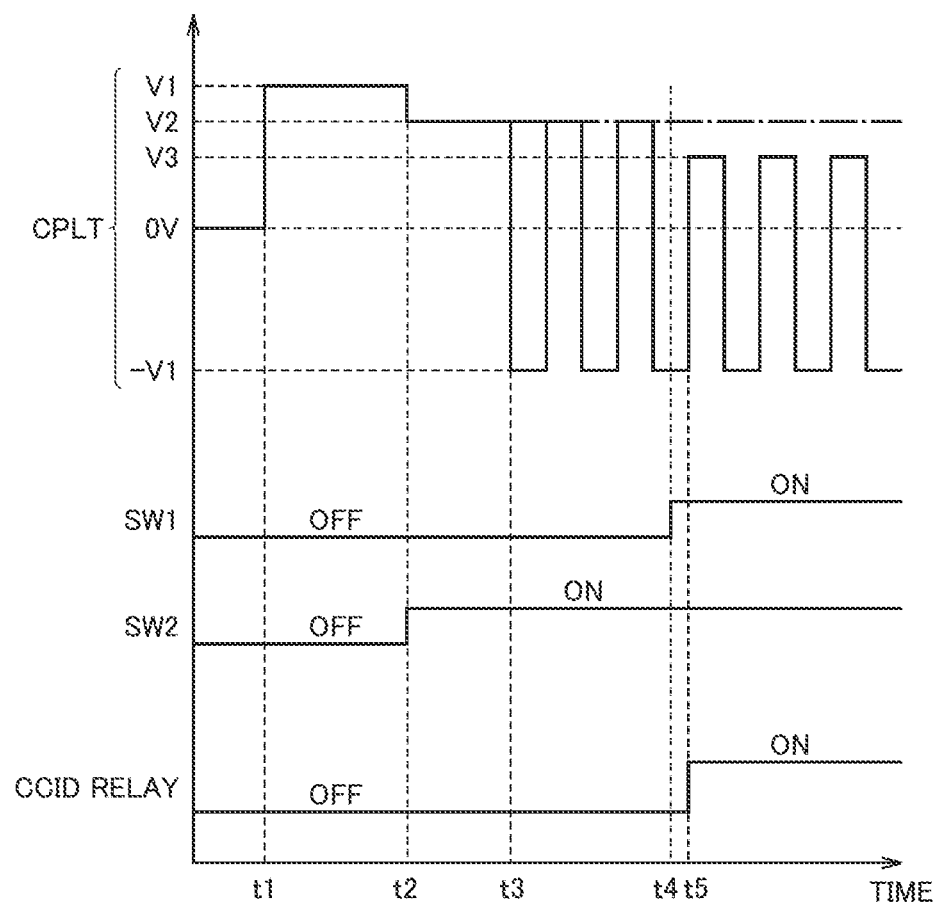
FIG. 3 shows a correspondence relationship among states of switches SW1 and SW2, a potential of a pilot signal CPLT, and a state of a CCID relay.

FIG. 3 shows a correspondence relationship among the states of switches SW1 and SW2, the potential of pilot signal CPLT, and the state of CCID relay 450. In FIG. 3, the horizontal axis represents the time, and the vertical axis represents the potential of pilot signal CPLT, the states of switches SW1 and SW2, and the state of CCID relay 450.

Before time t1, charging cable 400 is not connected to vehicle 1 and charging facility 500. In this state, each of switches SW1 and SW2 and CCID relay 450 are off and the potential of pilot signal CPLT is 0 V.

When plug 420 of charging cable 400 is connected to electrical outlet 520 of charging facility 500 at time t1, CPLT control circuit 470 generates pilot signal CPLT in accordance with the electric power from charging facility 500. At time t1, charging connector 410 of charging cable 400 is not connected to inlet 220. The potential of pilot signal CPLT is V1 (e.g., 12 V) and pilot signal CPLT is in a non-oscillating state.

When charging connector 410 is connected to inlet 220 at time t2, the potential of connection signal PISW input to CPU 310 changes. In response to the change in potential of connection signal PISW, CPU 310 turns on switch SW2. As a result, the potential of pilot signal CPLT drops to V2 (e.g., 9 V) by pull-down resistor R2.

When CCID control unit 460 detects that the potential of pilot signal CPLT has dropped to V2, CCID control unit 460 outputs an oscillation instruction to oscillator 472 and oscillates pilot signal CPLT at time t3.

When CPU 310 detects that pilot signal CPLT has been oscillated, CPU 310 detects the rated current of charging cable 400 based on the duty cycle of pilot signal CPLT. Then, at time t4, CPU 310 turns on switch SW1, in addition to switch SW2. As a result, the potential of pilot signal CPLT further drops to V3 (e.g., 6 V) by pull-down resistor R1.

When the potential of pilot signal CPLT drops to V3 at time t5, the contact point of CCID relay 450 is closed by CPLT control circuit 470. As a result, the electric power from charging facility 500 is transmitted to vehicle 1 through charging cable 400. Thereafter, in vehicle 1, charger 200 (see FIG. 1) is controlled by CPU 310, and thus, AC charging of battery 100 is started.

Figure 4:
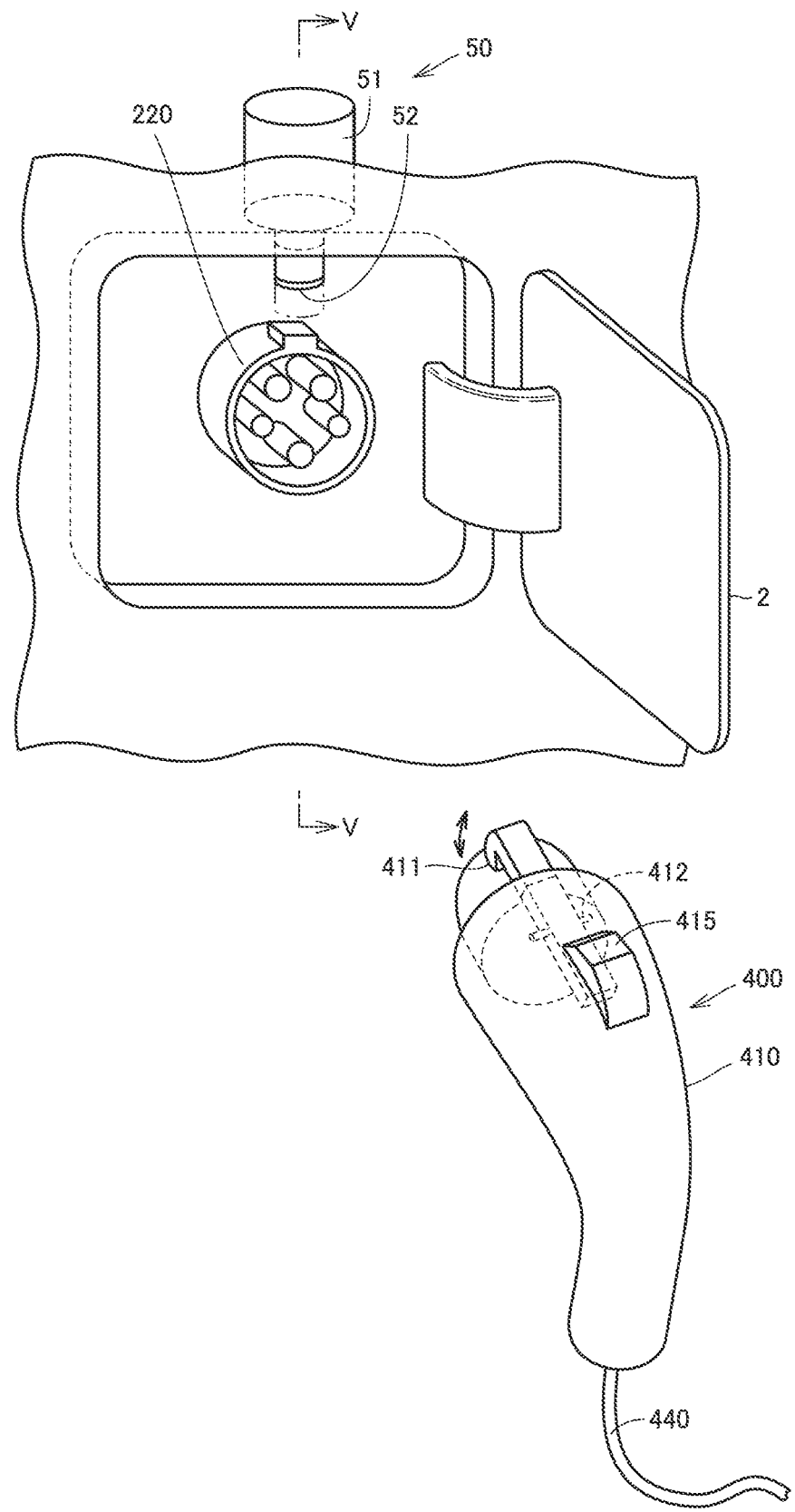
FIG. 4 shows a structure of an inlet and a structure around the inlet.
Figure 5:
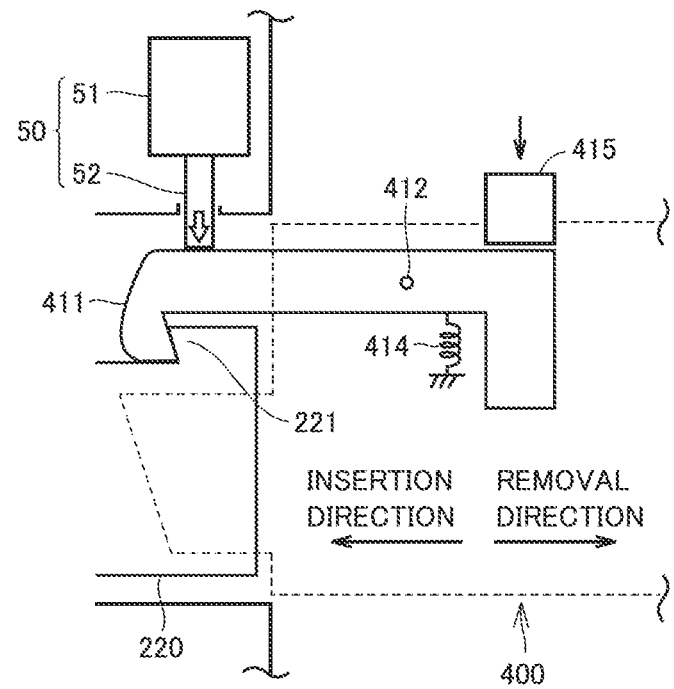
FIG. 5 is a cross-sectional view (No. 1) taken along V-V in FIG. 4.
Figure 6:
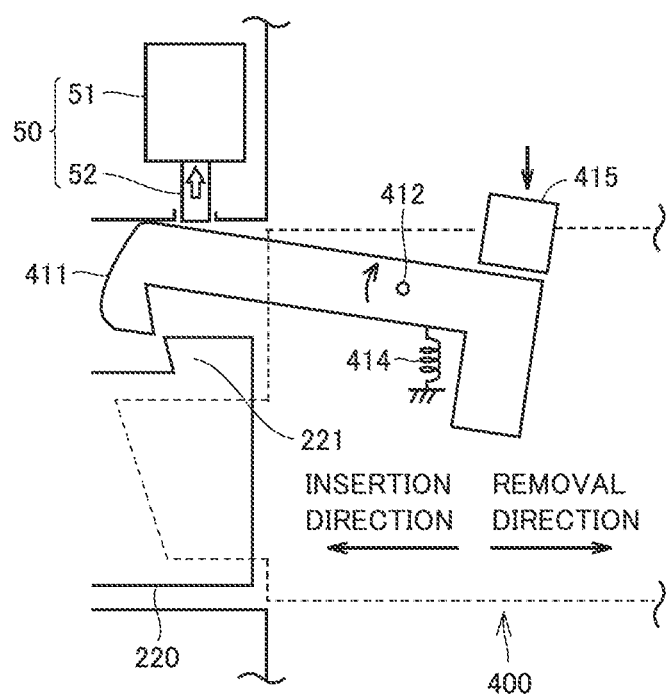
FIG. 6 is a cross-sectional view (No. 2) taken along V-V in FIG. 4.

FIG. 4 shows a structure of inlet 220 and a structure around inlet 220. FIGS. 5 and 6 are cross-sectional views taken along V-V in FIG. 4 when charging connector 410 is connected to inlet 220. Connection between charging connector 410 and inlet 220 and a configuration of locking device 50 will be described with reference to FIGS. 4 to 6.

Charging connector 410 of charging cable 400 is provided with a link 411. Link 411 is rotatably attached around a shaft 412. One end of link 411 is provided with a protruding portion that engages with a projection 221 of inlet 220, and the other end of link 411 is provided with a push button 415. Link 411 is elastically biased with respect to a main body of charging connector 410 by a spring 414 (see FIGS. 5 and 6).

When charging connector 410 is inserted into inlet 220, the protruding portion of link 411 engages with projection 221 of inlet 220 (see a state of link 411 and projection 221 in FIG. 5). Therefore, charging connector 410 is not detached from inlet 220.

Locking device 50 is provided above (near) inlet 220. As described above, locking device 50 switches between the locked state in which insertion and removal of charging connector 410 connected to inlet 220 into and from inlet 220 are restricted and the unlocked state in which charging connector 410 connected to inlet 220 can be inserted into and removed from inlet 220.

Locking device 50 includes a lock bar 52 that slides vertically, and an electromagnetic actuator 51 that slides lock bar 52.

In the locked state, lock bar 52 is slid downward and fixed at a position that is in contact with an upper surface of link 411 (see FIG. 5). As a result, even when push button 415 is pressed, rotation of link 411 is suppressed by lock bar 52, which prevents the protruding portion of link 411 from rising and being removed from projection 221 of inlet 220. That is, even when the user presses push button 415, the user cannot remove charging connector 410 from inlet 220.

In the unlocked state, lock bar 52 is slid upward and fixed at a position that does not suppress rotation of link 411 (see FIG. 6). As a result, lock bar 52 does not suppress rotation of link 411, and thus, when push button 415 is pressed, link 411 rotates around shaft 412 and the protruding portion provided at the end opposite to push button 415 rises. As a result, the protruding portion of link 411 is removed from projection 221 of inlet 220, and thus, charging connector 410 can be removed from inlet 220. That is, when the user presses push button 415, the user can remove charging connector 410 from inlet 220.

<First Mode and Second Mode>

In vehicle 1 configured as described above, ECU 300 of vehicle 1 has a first mode and a second mode as an operation mode of locking device 50. The first mode is a mode of bringing locking device 50 into the locked state when charging connector 410 is connected to inlet 220. The second mode is a mode of maintaining locking device 50 in the unlocked state when charging connector 410 is connected to inlet 220.

Referring again to FIG. 1, vehicle 1 further includes a setting device 600. Setting device 600 is a device for setting the operation mode of locking device 50. The user of vehicle 1 can set the operation mode of locking device 50 by operating setting device 600. Setting device 600 is, for example, a dedicated device for setting the operation mode of locking device 50, and selects a setting of the operation mode based on a user's touch operation. Setting device 600 is not limited to the above-described configuration. For example, a not-shown navigation device may function as setting device 600, or a multi-information display and a controller thereof (both are not shown) and the like may function as setting device 600. Alternatively, setting device 600 may be a physical changeover switch (e.g., toggle switch) that sets (switches) the operation mode of locking device 50 to the first mode or the second mode.

By operating setting device 600, the user of vehicle 1 can select the operation mode of locking device 50 in accordance with situations of vehicle 1 and user's preferences. The situations of vehicle 1 refer to various situations such as, for example, the case of performing the AC charging in a garage at home or the case of performing the AC charging outdoors.

Setting device 600 outputs a signal corresponding to the user operation to ECU 300. For example, when an operation for setting the operation mode to the first mode is performed, setting device 600 outputs, to ECU 300, a signal indicating that the first mode has been selected. For example, when an operation for setting the operation mode to the second mode is performed, setting device 600 outputs, to ECU 300, a signal indicating that the second mode has been selected. When ECU 300 permits a setting change of the operation mode as described below, ECU 300 makes the setting change of the operation mode in accordance with the signal received from setting device 600.

When connection of charging connector 410 to inlet 220 is detected, ECU 300 of vehicle 1 operates locking device 50 based on the set operation mode.

In the case where the operation mode of locking device 50 is set to the first mode, ECU 300 brings locking device 50 into the locked state when charging connector 410 is connected to inlet 220. In addition, in the case where the operation mode of locking device 50 is set to the first mode, ECU 300 brings locking device 50 into the unlocked state when the AC charging is completed. Alternatively, ECU 300 may bring locking device 50 into the unlocked state in conjunction with an operation for unlocking a door of vehicle 1. Alternatively, ECU 300 may bring locking device 50 into the unlocked state in response to an operation of a separately provided release switch. The release switch can be provided on, for example, inlet 220, a smart key of vehicle 1, or the like.

In the case where the operation mode of locking device 50 is set to the second mode, ECU 300 of vehicle 1 maintains locking device 50 in the unlocked state when charging connector 410 is connected to inlet 220. In the second mode, the AC charging is performed with locking device 50 being in the unlocked state. Therefore, a sequence for bringing locking device 50 into the unlocked state when the AC charging is completed is not incorporated.

ECU 300 of vehicle 1 according to the present embodiment does not shift the state of locking device 50 in accordance with the setting change of the operation mode of locking device 50. Specifically, even when the setting change of the operation mode is made in the state where charging connector 410 is connected to inlet 220, the state of locking device 50 does not shift. More specifically, for example, (1) in the case where the operation mode is set to the first mode, locking device 50 is brought into the locked state when charging connector 410 is connected to inlet 220. Even when the setting change of the operation mode from the first mode to the second mode is made in this state, locking device 50 is not brought into the unlocked state and is maintained in the locked state. For example, (2) in the case where the operation mode is set to the second mode, locking device 50 is maintained in the unlocked state when charging connector 410 is connected to inlet 220. Even when the setting change of the operation mode from the second mode to the first mode is made in this state, locking device 50 is not brought into the locked state and is maintained in the unlocked state.

When the operation mode is changed in the state where charging connector 410 is connected to inlet 220 as in the cases of (1) and (2) described above, a mismatch (inconsistency) between the operation mode and the state of locking device 50 occurs.

In the case of (1) described above, the setting change of the operation mode to the second mode is made in a state where locking device 50 is in the locked state. Therefore, even when the AC charging is completed, for example, locking device 50 is not brought from the locked state into the unlocked state, and thus, the locked state is not released. Therefore, the user of vehicle 1 needs to perform another operation for bringing locking device 50 into the unlocked state, such as, for example, the operation of the release switch.

In the case of (2) described above, the setting change of the operation mode to the first mode is made in a state where locking device 50 is in the unlocked state. The setting change of the operation mode to the first mode may, for example, cause the user of vehicle 1 to misrecognize that charging cable 400 has been locked (locking device 50 has been brought into the locked state). Actually, however, locking device 50 is maintained in the unlocked state. Therefore, after the user leaves vehicle 1, for example, a third person can disconnect charging connector 410 from inlet 220, and thus, charging cable 400 may be stolen.

Accordingly, vehicle 1 according to the present embodiment permits the setting change (switching) of the operation mode of locking device 50 when charging connector 410 is not connected to inlet 220, and does not permit the setting change of the operation mode of locking device 50 when charging connector 410 is connected to inlet 220. That is, the operation mode is changeable when charging connector 410 is not connected to inlet 220, and the operation mode is not changed when charging connector 410 is connected to inlet 220. Since the setting change of the operation mode is not permitted in the state where charging connector 410 is connected to inlet 220, the occurrence of a mismatch between the operation mode and the state of locking device 50 can be suppressed.

More specifically, ECU 300 of vehicle 1 determines permission/non-permission of the setting change of locking device 50 based on the potential of connection signal PISW.

When ECU 300 is receiving connection signal PISW having potential Vx determined by the voltage of power supply node 350, pull-up resistor R10 and resistor R5, ECU 300 determines that charging connector 410 is not connected to inlet 220, and permits the setting change of the operation mode of locking device 50.

When ECU 300 is receiving connection signal PISW having potential Vy determined by the voltage of power supply node 350, pull-up resistor R10 and resistors R5 and R6, ECU 300 determines that charging connector 410 is connected to inlet 220, and does not permit the setting change of the operation mode of locking device 50.

When ECU 300 is receiving connection signal PISW having potential Vz determined by the voltage of power supply node 350, pull-up resistor R10 and resistors R5 to R7, ECU 300 determines that charging connector 410 is connected to inlet 220. In this case as well, ECU 300 does not permit the setting change of the operation mode of locking device 50. When ECU 300 is receiving connection signal PISW having potential Vz, ECU 300 may permit the setting change of the operation mode of locking device 50.

<Process Performed by ECU>

Figure 7:
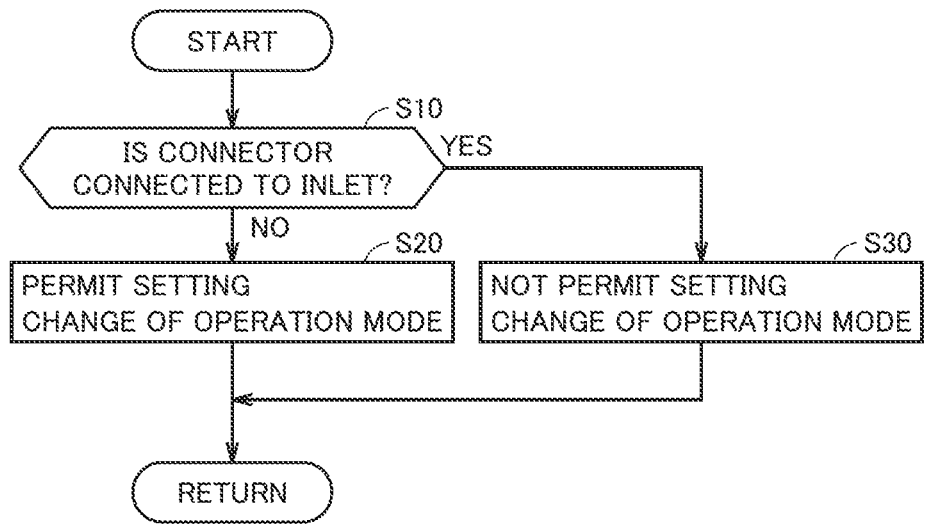
FIG. 7 is a flowchart showing a procedure of a process performed by an ECU.

FIG. 7 is a flowchart showing a procedure of a process performed by ECU 300. The process of the flowchart shown in FIG. 7 is started when a condition is satisfied, and is repeatedly performed every prescribed control period. The condition includes, for example, startup of vehicle 1 or detection of the input of pilot signal CPLT by ECU 300. Each step (abbreviated as "S" hereinafter) in the flowchart shown in FIG. 7 is described as being implemented by software processing by ECU 300. However, a part or all of the steps may be implemented by hardware (electric circuit) formed in ECU 300.

ECU 300 determines whether or not charging connector 410 is connected to inlet 220 (S10). Specifically, as described above, ECU 300 determines whether or not charging connector 410 is connected to inlet 220, based on the potential of connection signal PISW.

When ECU 300 determines that charging connector 410 is not connected to inlet 220 (NO in S10), ECU 300 permits the setting change of the operation mode of locking device 50 (S20). In this case, ECU 300 changes (switches) the operation mode of locking device 50 based on, for example, the user operation of setting device 600.

In contrast, when ECU 300 determines that charging connector 410 is connected to inlet 220 (YES in S10), ECU 300 does not permit the setting change of the operation mode of locking device 50 (S30). In this case, even when the user operation of setting device 600 is performed, for example, ECU 300 disables this operation and does not change (switch) the operation mode of locking device 50. As one modification of the case of not permitting the setting change of the operation mode, an operation for making a setting change of an operation mode of setting device 600 may be made impossible. When setting device 600 is a physical changeover switch, a lever is fixed to prevent switching of the switch.

Figure 8:
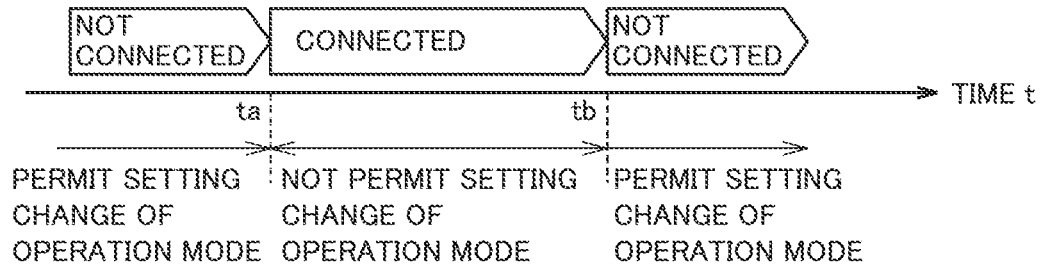
FIG. 8 is a diagram for illustrating a setting change of an operation mode of a locking device.

FIG. 8 is a diagram for illustrating the setting change of the operation mode of locking device 50. FIG. 8 shows transition of the connection state between inlet 220 and charging connector 410, and permission/non-permission of the setting change of the operation mode at each time.

Referring to FIG. 8, before time ta, charging connector 410 is not connected to inlet 220. Vehicle 1 is, for example, traveling or in a stop state. Since charging connector 410 is not connected to inlet 220 before time ta, the setting change of the operation mode of locking device 50 is permitted. The user can switch the operation mode of locking device 50 by operating setting device 600 (see FIG. 1).

At time ta, charging connector 410 is connected to inlet 220 in order to perform the AC charging. Since charging connector 410 is connected to inlet 220, the setting change of the operation mode of locking device 50 is switched to non-permission. In this case, even if the user operates setting device 600, the operation mode is not switched. That is, the operation mode set at time ta is maintained.

At time tb, the AC charging is ended and charging connector 410 is disconnected from inlet 220. That is, since charging connector 410 is not connected to inlet 220, the setting change of the operation mode of locking device 50 is permitted again.

As described above, vehicle 1 according to the present embodiment has the first mode and the second mode as the operation mode of locking device 50. When charging connector 410 of charging cable 400 is not connected to inlet 220, vehicle 1 permits the setting change of the operation mode based on the operation of setting device 600. As a result, the user can select the operation mode suitable for user's preferences or situations.

When charging connector 410 is connected to inlet 220, vehicle 1 according to the present embodiment does not permit the setting change of the operation mode. As a result, the occurrence of a mismatch between the operation mode and the state of the locking device can be suppressed.

[First Modification]

In the embodiment, description has been given of the example in which the external charging is implemented by the AC charging. However, the external charging is not limited to the AC charging and may be DC charging to charge battery 100 mounted on vehicle 1, using electric power supplied from a DC power supply external to vehicle 1. The present disclosure is also applicable to the DC charging, similarly to the AC charging.

[Second Modification]

In the embodiment, description has been given of the example in which setting device 600 is provided in vehicle 1. However, setting device 600 is not limited to a device provided in vehicle 1. For example, setting device 600 may include a device provided outside vehicle 1, in addition to or instead of the device provided in vehicle 1. In a second modification, description will be given of an example in which the charging system further includes a smartphone 600A (see FIG. 1) of the user as setting device 600.

Smartphone 600A performs wireless bidirectional communication with ECU 300. Prescribed application software is installed on smartphone 600A. Smartphone 600A makes the setting change of the operation mode of locking device 50 in response to an operation performed on an image displayed while the application software is being activated. For example, when the user performs an operation for selecting the first mode on smartphone 600A, smartphone 600A outputs, to ECU 300, a signal indicating that the first mode has been selected. For example, when the user performs an operation for selecting the second mode on smartphone 600A, smartphone 600A outputs, to ECU 300, a signal indicating that the second mode has been selected. When ECU 300 permits the setting change of the operation mode, ECU 300 makes the setting change of the operation mode in accordance with the signal received from smartphone 600A.

As described above, ECU 300 receives the signal from the device (smartphone 600A) provided outside vehicle 1, which can produce an effect similar to that of the embodiment.

[Third Modification]

In the embodiment, description has been given of the example in which locking device 50 is provided in vehicle 1. However, the function of locking device 50 is not limited to being provided on the vehicle 1 side. For example, the function of locking device 50 may be provided on the charging cable 400 side. In a third modification, description will be given of an example in which the function of locking device 50 is provided on the charging cable 400 side.

In the third modification, push button 415 provided on charging connector 410 functions as a locking device. Specifically, push button 415 switches between the locked state and the unlocked state. In the locked state, push button 415 is fixed by, for example, a not-shown actuator so as not to move even when the user pushes push button 415. In the unlocked state, push button 415 is not fixed.

The switching between the locked state and the unlocked state by push button 415 is controlled by, for example, CCID control unit 460. Similarly to ECU 300 according to the embodiment, CCID control unit 460 has a first mode and a second mode as an operation mode of push button 415. Based on the potential of pilot signal CPLT, CCID control unit 460 detects that charging connector 410 has been connected to inlet 220. Specifically, by detecting a drop in potential of pilot signal CPLT to V2, CCID control unit 460 detects that charging connector 410 has been connected to inlet 220.

CCID control unit 460 permits a setting change of the operation mode of push button 415 when charging connector 410 is not connected to inlet 220, and does not permit the setting change of the operation mode of push button 415 when charging connector 410 is connected to inlet 220. In the third modification as well, the setting change of the operation mode is not permitted in the state where charging connector 410 is connected to inlet 220. Therefore, the occurrence of a mismatch between the operation mode and the state of push button 415 can be suppressed.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle that performs charging of a power storage device mounted on the vehicle, using electric power supplied through a charging cable from a power supply external to the vehicle, the vehicle comprising:
   an inlet to which a connector provided in the charging cable is connectable;
   a locking device that switches between a locked state and an unlocked state of the connector connected to the inlet and the inlet; and
   a controller that controls the locking device, wherein
   the controller sets an operation mode of the locking device to a first mode or a second mode, the first mode being a mode of bringing the locking device into the locked state when the connector is connected to the inlet, the second mode being a mode of maintaining the locking device in the unlocked state when the connector is connected to the inlet, and
   the controller never permits a setting change of the operation mode when the connector is connected to the inlet.

2. The vehicle according to claim 1, wherein
   the controller permits the setting change of the operation mode when the connector is not connected to the inlet.

3. The vehicle according to claim 2, wherein
   the controller receives a signal for the setting change of the operation mode based on a user operation, and
   the controller changes a setting of the operation mode based on the signal, when the controller permits the setting change of the operation mode.

4. The vehicle according to claim 3, further comprising a setting device operated by a user for making the signal, wherein
   the setting device outputs the signal based on the user operation.

5. The vehicle according to claim 4, wherein the setting device comprises a multi-information display.

6. The vehicle according to claim 4, wherein the setting device comprises a navigation device.

7. The vehicle according to claim 1, wherein the controller is an electronic control unit.

8. A locking control system comprising:
   a locking device; and
   a controller that controls the locking device, wherein
   the locking device switches between a locked state of a connector and an inlet of a vehicle and an unlocked state of the connector and the inlet, the vehicle performing charging of a power storage device mounted on the vehicle, using electric power supplied through a charging cable from a power supply external to the vehicle, the connector being provided in the charging cable and connected to the inlet,
   the controller sets an operation mode of the locking device to a first mode or a second mode, the first mode being a mode of bringing the locking device into the locked state when the connector is connected to the inlet, the second mode being a mode of maintaining the locking device in the unlocked state when the connector is connected to the inlet, and
   the controller never permits a setting change of the operation mode when the connector is connected to the inlet.

* * * * *